United States Patent
Godbold

[15] 3,660,104
[45] May 2, 1972

[54] GAME FEED
[72] Inventor: Roy Herman Godbold, Marfa, Tex.
[73] Assignee: Godbold, Inc., Marfa, Tex.
[22] Filed: Mar. 14, 1969
[21] Appl. No.: 807,424

[52] U.S. Cl. ..........................................99/4, 99/2 R, 99/6, 99/17
[51] Int. Cl. ..........................................A23k 1/14, A23k 1/02
[58] Field of Search ........................99/2, 2 C, 4, 2 AB, 6, 17; 119/51 R

[56] References Cited

UNITED STATES PATENTS

| | | |
|---|---|---|
| 3,532,503 | 10/1970 | Kviesitis....................................99/6 |
| 3,022,218 | 2/1962 | Sherman..................................99/2 X |
| 3,035,920 | 5/1962 | Knodt.....................................99/2 I X |
| 3,175,536 | 3/1965 | Hilaire..................................119/51 R |
| 3,279,923 | 10/1966 | Bauer et al...................................99/2 |

*Primary Examiner*—Norman Yudkoff
*Assistant Examiner*—Kenneth Van Wyck
*Attorney*—Littlepage, Quaintance, Wray & Aisenberg

[57] ABSTRACT

A food block has been prepared for quail. Although this bird thrives on the block, said block is relatively unattractive to other birds and to animals.

1 Claim, No Drawings

3,660,104

GAME FEED

BACKGROUND

Quail, such as scaled quail and bobwhite quail, are found throughout much of the United States. Texas alone has more than a million hunters. A survey conducted by the Bureau of the Census in 1960 showed that 321,000 quail hunters bagged 9.8 million birds, most of which were bobwhites. Quail supplies many hours of recreation and many pounds of meat for outdoorsmen.

During the winter, quail assemble in large coveys which often include 100 birds. Since quail travels a very short distance, e.g. ¾ to 1.5 miles, from its roosting site during the winter months, food supply is an important factor which effects both survival and reproduction. When food supply is short during the winter and spring months, the reproduction rate of wild quail can decline materially.

Quail thrives on a variety of foods and a balanced diet. A study of bobwhite quail showed a consistent weight loss and many deaths from diets composed of single foods, such as corn, sorghum, sunflower, sand dropseed, Johnson grass and pigweed, all of which are eaten in quantity by quail. A balanced diet is a material consideration.

SUMMARY

A food block has been prepared for the feeding of quail. Although it serves a useful purpose throughout the year, it is of particular advantage when other quail food is in short supply, e.g. during winter and early spring. Not only do quail thrive on this food block, but their reproductive rate is increased. Moreover, the mating time of wild quail which feed on said block is actually advanced; this is beneficial. The food block is comprised of soy bean meal, phosphate, e.g. dicalcium phosphate, molasses and binder; said block may be supplemented with Vitamin A and/or antibiotics.

It is an object of this invention to provide a means of feeding quail. A further object is to prepare a food block on which quail can thrive. Another object is to increase the reproduction of quail. A still further object is to formulate a food block which is attractive to quail, but not generally to other birds or to wild animals. It is also an object to prepare a food block in such a way that it will withstand exposure to the elements particularly during winter months in areas where quail live. Additional objects are apparent from the description herein provided.

DESCRIPTION

Quail multiply in good years of abundant feed. In dry years these birds die off and fail to reproduce. If quail are supplemented during the critical time, their "livability" can be greatly increased, as well as their reproductive rate. Unfortunately, it is difficult to feed wild quail because other birds and wild animals, particularly rodents, consume the feed.

A high protein feed which satisfies the requirements for wild quail has been formulated and prepared in block form. [Feed which contains at least 25 percent (by weight) protein is regarded as high protein feed.] One 25-pound block of this feed will feed one hundred quail for approximately 23 days in the most severe part of winter and spring. This is possible because other birds and mammals, such as rodents, do not eat the block.

A typical formulation comprises from 80 to 85 percent by weight of soybean meal (also referred to as soybean oil meal), from 3 to 6 percent by weight of phosphate, from 5 to 10 percent by weight of molasses and from 2.5 to 5 percent by weight of binder. In addition, a vitamin premix can be incorporated in the formulation to provide up to 20,000 units (per pound of block) of Vitamin A; from 0 to 1.5 percent by weight of fat can be added; and an antibiotic, e.g. chlorotetracycline (100 grams per ton), may be added.

The soybean meal has a high protein content, e.g. from 41 to 44 percent by weight (based on the total weight of soybean meal), and is a standard commodity of commerce. In any given lot the particle size ordinarily varies from about one-eighth inch in diameter to dust. For the subject invention it is preferred to have meal with particles having a diameter of approximately one-sixteenth inch and a minimum of dust. Soybean meal having 50 percent protein is ordinarily ground to a flour; such a fine particle size is not desirable.

It is preferred to maintain the fat content of the soybean meal at a level of at most 2 percent by weight (based on the weight of the soybean meal). A higher fat content encourages rodents, such as rabbits, field mice and ground squirrels, to eat the block. Excessive fat causes the block to crumble when exposed to the elements and lessens palatability to quail.

The soybean oil meal may be replaced at least in part by other ingredients having comparable nutritional value for quail. Each block preferably has a soybean oil meal content of at least 60 percent by weight. It is essential that the food block provide a primarily balanced diet for quail and attract virtually only quail from the wild life that may have access to it. Thoroughly cooked soybean meal is virtually the best substitute for protein supplements of animal origin. Today, all soybean meal is cooked. Although the quality of the quail feed would be reduced, up to 25 percent by weight of the soybean meal could be replaced by cottonseed meal. Replacing soybean meal (up to 35 percent by weight) with peanut meal increases the risk of attracting rodents. Replacing soybean meal with fish meal and or meat scraps also results in attracting rodents and also causes the block to be unstable (if used in large amounts) because of the increased fat content.

The phosphate can be dicalcium phosphate or any other phosphate suitable as a feed supplement, e.g. defluorinated phosphate. It is preferred to use a phosphate with a calcium:phosphorus ratio from 2:1 to 1:1 and which is digestible by poultry. The phosphate generally provides mineral, calcium and phosphorus required for egg production and general quail health.

The molasses is preferably cane molasses of from 79.5 to 84 Brix. (The Brix is merely a measure of total sugar and is not critical.) Any type of molasses, e.g. beet and wood, can be used; in fact water and lignin sulfonate can be used as the binder without molasses. Blocks made with water in place of molasses weather, crack and sometimes fail to harden correctly. As the amount of molasses is increased above 10 percent by weight, rodents are attracted to the resulting block. The actual amount of molasses employed is somewhat dependent on the particle size of the soybean meal; the finer the particle size, the greater the amount of molasses. The particle size of soybean meal varies from shipment to shipment. Also, as the meal flows through to holding bins and machinery each batch can vary.

It is necessary for the paddle mixer operator to recognize when more or less molasses is needed; after the feed is mixed with approximately the correct amount of molasses and steam has been added, a sample is squeezed in the hand; if the product sticks together in a very fragile lump, it is ready to block; if the material fails to make a fragile lump and remains dry, more molasses should be added. The molasses usually varies from 5 percent to 10 percent by weight of the mix. A skilled operator can look at the material tumbling in the mixer and know when the molasses content is correct.

The general rule is that the finer the soybean meal the more molasses. Molasses should be employed in as small a quantity as necessary to assist with the binding of the materials in the block. There may be an actual cooperation between the molasses and the binder, as is the case when lignin sulfonate is employed as binder. Lignin sulfonate, together with the sugar in molasses and moisture from steam and from molasses, forms a most satisfactory block.

The preferred binder is lignin sulfonate. Although other binders, e.g. dextrin, guar gum, fermentation solubles, bentonite and solvent extracted sunflower meal, can be employed; lignin sulfonate is preferred because it is not palatable to rodents.

As the lignin sulfonate calcium lignosulfonate, e.g. Stapel [product of Consolidated Water Power and Paper Company having an analysis of 5 percent moisture, 60 percent bone dry calcium lignosulfonate, reducing sugars (15 percent hexoses and 7 percent pentoses), 14 percent hemicelluloses and 4 percent inorganics], can be employed.

Although there is no absolute requirement for adding vitamins to the food block composition, a level of about 20,000 units (per pound of block) of Vitamin A is preferred in a supplementary feed for wild quail. This will protect the birds when their consumption of the block is limited by the availability of other feed in pastures. When no green feed is available, the presence of Vitamin A in the block is necessary for quail reproduction. Vitamin premixes are available in many strengths and can be readily obtained in a concentration that will provide the desired concentration in the finished block.

When the amount of fat in the soybean meal is below 2 percent by weight, it can be supplemented by the addition of fat from vegetable or animal origin, e.g. palm oil, olive oil, lard and neatsfoot oil. Any fat can be used, but vegetable oil is preferred because of its availability. The fat content of the block should be at least 0.5 percent by weight and, preferably, should not exceed 2 percent by weight. A block having a fat content of 1.5 percent by weight is most desirable. The fat content should be adequate to permit the block to slip through the forming chamber of the press in which the block is prepared. Ordinarily the fat content of the soybean meal is adequate for this purpose and no additional fat is necessary. It is important to maintain a low fat level. Excessive fat or oil may preclude the hardening of the resulting block and attract rodents.

Antibiotics can be employed to improve the general health of quail and hatchability of eggs. For this purpose, for example, chlorotetracycline hydrochloride could be employed in an amount to provide, e.g., 100 grams per ton of feed block.

The size of the food block is not critical. Blocks can be prepared of any size from, e.g., 5 pounds to 100 pounds and in any dimensions or shape. A 25-pound block is preferred in view of its feeding capacity, as indicated in the preceding discussion; the shape is a matter of convenience and practicality.

Feed blocks should be placed in the normal range of wild quail coveys and protected from livestock. (Livestock will eat the blocks.) The blocks have the additional advantage of retaining coveys in a given area.

FORMULATIONS

| | Ingredient | Weight, pounds |
|---|---|---|
| A. | Soybean Meal | 800 |
| | Dicalcium Phosphate | 60 |
| | Cane Molasses (79.5 Brix) | 90 |
| | Lignin Sulfonate | 45 |
| | Hydrolyzed Vegetable Oil | 5 |
| B. | Soybean Meal | 850 |
| | Defluorinated Phosphate | 50 |
| | Cane Molasses (84 Brix) | 50 |
| | Guar Meal | 50 |
| C. | Soybean Meal | 830 |
| | Dicalcium Phosphate | 40 |
| | Beet Molasses | 70 |
| | Lignin Sulfonate | 50 |
| | Animal Tallow | 10 |
| D. | Soybean Meal | 830 |
| | Curacao Phosphate | 50 |
| | Cane Molasses (82 Brix) | 100 |
| | Dextrin | 20 |
| E. | Soybean Meal | 825 |
| | Dicalcium Phosphate | 56.5 |
| | Cane Molasses (79.5 Brix) | 61.5 |
| | Lignin Sulfonate | 40 |
| | Vitamin A Premix (soybean meal and vitamin A palmitate mixed so as to contain 1,180,000 USP Units of vitamin A per pound) | 17 |
| F. | Soybean Meal | 850 |
| | Steamed Bone Meal | 30 |
| | Cane Molasses (84 Brix) | 95 |
| | Fermentation Solubles | 25 |
| G. | Soybean Meal | 825 |
| | Dicalcium Phosphate | 60 |
| | Wood Molasses | 60 |
| | Lignin Sulfonate | 40 |
| | Cottonseed Oil and/or Soybean Oil | 15 |
| H. | Soybean Meal | 840 |
| | Dicalcium Phosphate | 45 |
| | Cane Molasses (79.5 Brix) | 80 |
| | Solvent Extracted Sunflower Meal | 35 |
| | Chlorotetracycline Hydrochloride | 50 grams |

(Soybeans are grown for their oil content. After the oil is extracted with a suitable solvent, e.g. petroleum ether, a meal remains. This meal is of value for its protein content, which may be, e.g., from 41 to 44 percent by weight. The thus-extracted soybean meal has a fat content of at most 2 percent by weight. Since the feed block requires a fat content of at least 0.5 percent by weight and as much as 2 percent by weight is not detrimental, fat can be separately incorporated as an ingredient as in formulations A, C and G.

PREPARATION OF BLOCK

Each of the preceding formulations, e.g. formulation E, can be prepared into 25 pound blocks according to the following procedure:

Mix all dry ingredients in a ribbon mixer. (A vertical mixer can alternatively be employed.) Introduce the ingredients into the mixer while the mixer is running and continue the mixing for three minutes after the last ingredient is added.

Convey resulting dry mixed ingredients to a horizontal paddle mixer. With the mixer running and with the mixed dry ingredients in it, add the molasses to said dry ingredients. This is done by injecting steam in the molasses line just prior to the entry of the molasses into the paddle mixer. (The steam is preferably at a temperature of from 323° to 337° F, but this temperature range is not critical.) After the molasses has been added, continue to steam the feed in the mixer for three minutes. [Sufficient steam is added to raise the temperature of the mix about 15° F.]

The thus-prepared feed is now ready for blocking. Charge it through automatic scales to a block press. (The block press has a forming chamber with a square cross-section, each edge of which is 8.5 inches.) Exert sufficient pressure on the material in the block press so that the length of the block (25 pounds) ejected therefrom is ten inches. Abut five minutes after the block is ejected, it will measure about 10.75 inches in length due to stretch or expansion. Each block should be warehoused for 24 hours before shipping.

The invention and its advantages are readily understood and appreciated from the preceding description, and it is apparent that various changes may be made in the procedure, formulation and product without departing from the spirit or scope of the invention or sacrificing its material advantages, the procedures, formulations and products hereinbefore described being merely illustrative of preferred embodiments of said invention.

What is claimed is:

1. A method of feeding quail a feed block which consists of from 60 to 85 percent by weight of high-protein vegetable meal, from 3 to 6 percent by weight of assimilatable phosphate, from 5 to 10 percent by weight of molasses, from 2.5 to 5 percent by weight of binder, from 0 percent by weight to a pharmacologically acceptable level of vitamin and from 0 percent by weight to a pharmacologically acceptable level of antibiotic; the high-protein vegetable meal being constituted by soybean meal and at most one member selected from the group consisting of cottonseed meal and peanut meal, the cottonseed meal being from 0 to 25 percent by weight based on the total weight of high-protein vegetable meal and the peanut meal being from 0 to 35 percent by weight based on the total weight of high-protein vegetable meal; the phosphate being digestible by poultry; the binder being selected from the group consisting of lignin sulfonate, dextrin, guar gum, fermentation solubles, bentonite and solvent-extracted sunflower meal; the feed block containing at least 25 percent by weight of protein and being prepared by a method comprising:

a. introducing all dry ingredients into a mixer while the mixer is running and continuing the mixing after all such ingredients are in the mixer;

b/ adding the molasses to the dry ingredients in the mixer while the mixer is running by steam injection into a line carrying the molasses and just prior to entry of the molasses into the mixer;

c. continuing to steam feed in the mixer after the molasses has been added to raise the temperature of such feed by about 15°F;

d. charging a weighed amount of the thus-prepared feed to a block press and thus-preparing the feed block.

* * * * *